(No Model.)
W. B. PEET.
SLIDING SEAT INDICATOR.
No. 550,642. Patented Dec. 3, 1895.
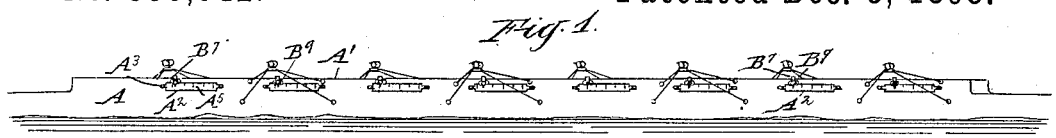
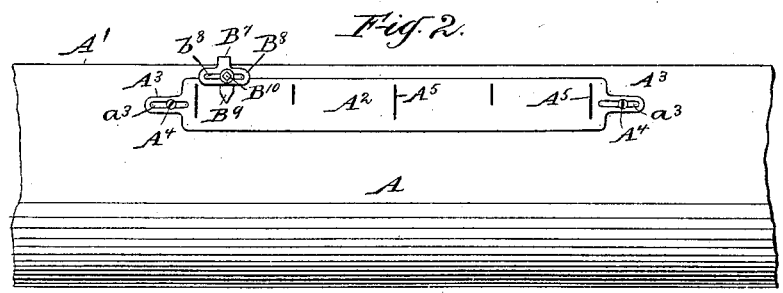
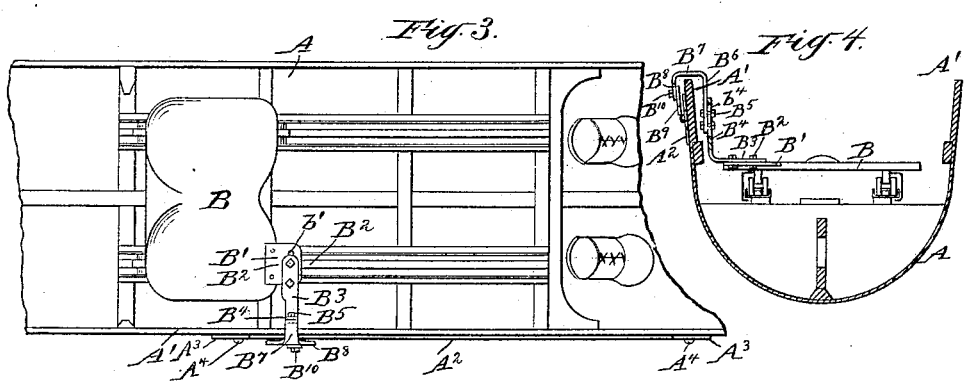
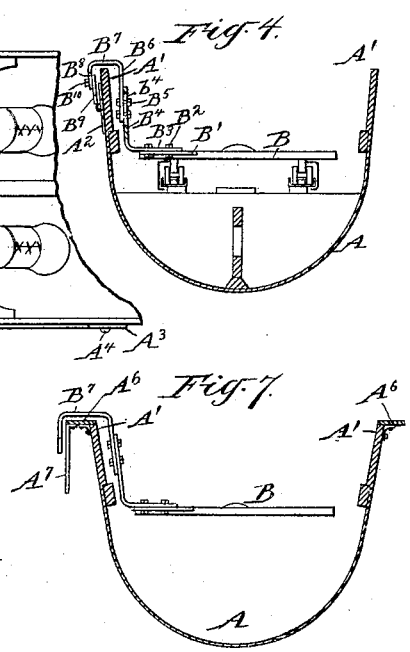
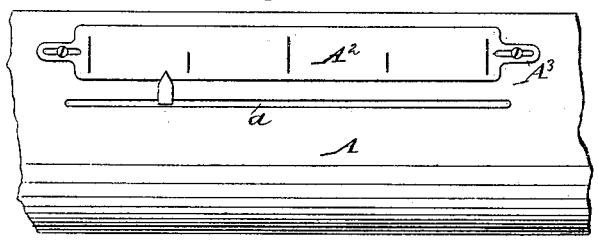
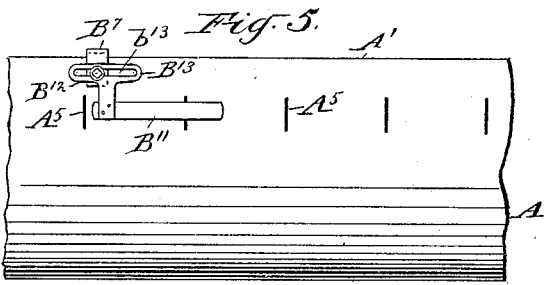
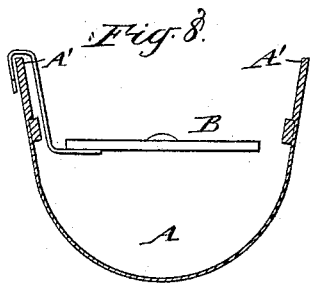
Witnesses:
Chas. E. Searle.
Richard Handy
Inventor:
Walter B. Peet,
by his attorney,
Charles R. Searle.

UNITED STATES PATENT OFFICE.

WALTER B. PEET, OF YONKERS, NEW YORK.

SLIDING-SEAT INDICATOR.

SPECIFICATION forming part of Letters Patent No. 550,642, dated December 3, 1895.

Application filed August 13, 1895. Serial No. 559,149. (No model.)

*To all whom it may concern:*

Be it known that I, WALTER B. PEET, a citizen of the United States, residing at Yonkers, in the county of Westchester and State of New York, have invented a certain new and useful Improvement in Sliding-Seat Indicators, of which the following is a specification.

The proper use of the sliding seats in a shell by the crew is a factor of much importance in fast rowing, and in order to successfully teach oarsmen the manner of sliding it is necessary that the coach shall be able to ascertain, first, the distance that the seat travels; second, the speed of travel of each seat at all parts of the stroke and the proportion of the whole travel made at a fast rate and the proportion made at a slow rate; third, the times of starting and stopping the several seats, indicating whether or not they are moving in unison, and, fourth, the position and movements of the seat relatively to the shoulders, back, hands, &c., of the oarsman at different parts of the stroke.

Ordinarily the seat is hidden by the coaming and side of the shell, and the coach in an accompanying boat can judge only approximately as to the above points.

The object of my invention is to render the position of the sliding seat clearly visible upon the outside of the shell. I attain this important end by attaching to the seat an indicator reaching the outer surface of the boat and readily seen and followed by the eye of the coach, and by means of a scale carried on the outer surface in proper relation to the indicator make it practicable to note exactly the position and various movements of the sliding seat. With the information thus obtained the coach is enabled by instruction to correct the faults in the sliding of the oarsman and teach him the proper manner of moving the seat.

The accompanying drawings form a part of this specification and represent what I consider the best means of carrying out the invention.

Figure 1 is a side elevation of the middle portion of an eight-oared shell equipped with my invention. The remaining figures are on a larger scale. Fig. 2 is a side view of a portion, showing one scale and indicator. Fig. 3 is a plan view of the same. Fig. 4 is a corresponding transverse section. Fig. 5 is a side elevation, showing a modification in which the indicator is a bar of the same length as the seat. Fig. 6 is a similar view of another form in which the indicator works in a slot cut in the shell. Fig. 7 is a cross-section showing the device adapted to serve with removable washboards attached to the coaming. Fig. 8 is an elevation showing another modification in which the indicator is formed by bending a single strip of metal.

Similar letters of reference indicate corresponding parts in all the figures.

A is a racing-shell of any ordinary or approved construction, provided with the usual sliding seats B and other equipments common to boats of this class.

The indicators for all the seats are similar in construction, and a description of one will suffice. It will also be understood that, although I have shown an eight-oared shell, the invention will serve with boats having any number of seats.

Attached to the seat B at the rear and near one side is a bracket $B'$, having a slot $b'$ extending transversely of the shell and receiving the bolts $B^2$, by which the lower arm $B^3$ of an L-shaped bar $B^3 B^4$ is adjustably secured. The vertical arm $B^4$ is slotted at $b^4$ and receives bolts $B^5$, adjustably holding an upwardly-extending strip $B^6 B^7$, the short arm $B^7$ of which is bent outward at a right angle and extends laterally over and close to the edge of the coaming $A'$, and carries a hanging plate $B^8$ parallel with the side of the boat and reaching a short distance longitudinally in both directions from the arm $B^7$. It is slotted lengthwise, as indicated at $b^8$, and carries a pointer $B^9$, adjustable fore and aft by means of the bolt $B^{10}$, engaged in the slot $b^8$ and extending through the pointer.

$A^2$ is a plate having an extension or lug $A^3$ at each end, attached to the side of the shell by screws $A^4$, reaching the latter through slots $a^3$ in the lugs. The outer surface of the plate carries a series of equally-spaced vertical marks $A^5$, painted on a strongly-contrasting ground and forming a scale. It is held in such relation to the pointer $B^9$ that the latter shall travel back and forth close to the upper edge of the scale as the sliding seat to which it is connected moves in one direction or the other. The scale may be adjusted relatively to the travel of the seat to an extent limited by the slots $a^3$ by slackening the screws $A^4$ and shifting the plate $A^2$ to the new position and again securing it. The vertical and lateral adjustments at the junction with the seat and in the arms $B^4 B^6$ allow the same device to be removed and applied to seats in other shells of differing dimensions and shapes.

I have in practice made the scale two feet in length, having five marks $A^5$ painted black on the white surface of the plate at intervals of six inches. Thus conditioned, the position of the pointer, also black in color, can be clearly seen at a considerable distance by the coach in an attending boat when the crew is rowing, and any faults in distance, manner, &c., of the sliding of the oarsmen may be corrected.

I have shown all the scales and indicators on the same side of the boat, so that the movements and positions of all the seats may be compared at the same time. Indicators and scales for each seat can, however, be placed on both sides; or the indicators and scales for the seats of the port men may be placed on one side of the boat and those of the starboard men on the other.

Modifications may be made within wide limits without departing from the invention or sacrificing its advantages. The plate $A^2$ may be dispensed with and the scale painted directly upon the outer surface of the shell.

Fig. 5 shows a form in which a strip of metal $B^{11}$, equal in length to the seat, is attached to the overhanging end of the arm $B^7$ and is adjustably held by a bolt $B^{12}$, corresponding to the bolt $B^{10}$, extending through a slot $b^{13}$ in a lug $B^{13}$, formed on one end of the strip.

In Fig. 6 a long slot $a$ is cut through the side of the boat, and a pointer attached to the seat travels therein, showing the various positions.

Fig. 7 shows an arrangement adapted to be used on shells having washboards $A^6$ permanently or temporarily secured to the coaming. An arm $B^7$, longer than before shown, extends outward and carries a pointer indicating the positions on a scale-plate $A^7$, attached to the under side of the washboard near its outer edge.

The indicator may be constructed in the manner shown in Fig. 8 by bending a single strip of metal to the shape required to conform to the contour of the shell with which it is to be used and attaching one end directly to the seat, the other end serving as a pointer with or without a scale attached to or painted upon the surface of the boat. This form serves well when it is to be used on one size and make of shell alone and has the advantage of being easily and cheaply made and applied.

The indicator may be on the same side of the boat as the oar belonging to that seat or on the opposite side, as may be preferred.

The invention may be applied, if desired, to the seats of the fixed rowing-machines used for winter practice or on rowing-tanks.

The following are some of the practical advantages of the invention:

The distance which the seat travels can be seen while the man is rowing, and he may be coached to lengthen or shorten his slide, as may be found necessary.

The indicator also shows whether or not the oarsmen shorten the distance which their seats slide when quickening the stroke or on becoming tired. It shows the speed of travel of the seat at all parts of the stroke. The seat on recover should start quickly and stop slowly and carefully, so that the headway of the boat will not be checked. It shows the times of starting and stopping the seats, so that all the oarsmen may be compared in this respect and taught and corrected until all the seats shall move in unison, and it also enables the coach to discover any faulty position of certain parts of the body of the oarsman (shoulders, back, hands, &c.) relatively to the position and movements of the seat.

I claim as my invention—

1. A boat adapted to be propelled by oars, and an oarsman's sliding seat therein, in combination with an indicator partaking of the motion of said seat and extending to the outer surface of the boat, and a scale carried by the boat on such surface, located in such relation to the indicator as to show the fore and aft positions of the seat relatively to the boat, all substantially as herein specified.

2. A boat and an oarsman's sliding seat therein, in combination with an indicator adjustably attached to and moving with the seat and reaching the outer surface of the boat, and a plate adjustably secured upon such surface, carrying a scale in such relation to the indicator as to show the relative positions of the seat and boat, all substantially as herein specified.

3. The boat A, sliding seat B, hanging plate $B^8$ and connections to the latter from the seat so that the plate will move therewith, the pointer $B^9$ adjustably mounted on said plate and the scale plate $A^2$ adjustably secured to the outer surface of the boat in such relation to the said pointer as to show the relative positions of the seat and boat, all combined and arranged substantially as herein specified.

4. The boat A, sliding seat B, bracket B' having the slot $b'$, bar $B^3$, $B^4$ adjustably secured to the bracket by the bolts $B^2$, strip $B^6$, $B^7$ adjustably attached to the upright arm of the said bar by bolts $B^5$, hanging plate $B^8$ on the lateral arm of said strip, having a slot $b^8$, and the pointer $B^9$ secured adjustably to the said hanging plate by the bolt $B^{10}$, all combined and arranged to serve substantially as herein specified.

5. The boat A, sliding seat B, bracket B' having the slot $b'$, bar $B^3$, $B^4$ adjustably attached to the bracket by the bolts $B^2$, strip $B^6$, $B^7$ adjustably secured to the upright arm of the said bar by bolts $B^5$, hanging plate $B^8$ on the lateral arm of said strip, having a slot $b^8$ and the pointer $B^9$ secured adjustably to the said hanging plate by the bolt $B^{10}$, in combination with each other and with the scale plate $A^2$ having lugs $A^3$ slotted as shown and adjustably secured to the outer surface of the boat by screws $A^4$ and adapted to serve with the said pointer to show the relative positions of the seat and boat, all substantially as herein specified.

In testimony that I claim the invention above set forth I affix my signature in presence of two witnesses.

WALTER B. PEET.

Witnesses:
M. J. McCARTY,
CHAS. E. SEARLE.